(12) United States Patent
Hotta et al.

(10) Patent No.: US 8,539,035 B2
(45) Date of Patent: Sep. 17, 2013

(54) MESSAGE TYING PROCESSING METHOD AND APPARATUS

(75) Inventors: Yuuji Hotta, Kawasaki (JP); Motoyuki Kawaba, Kawasaki (JP); Hidekazu Takahashi, Kawasaki (JP); Lilian Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 152 days.

(21) Appl. No.: 12/559,918

(22) Filed: Sep. 15, 2009

(65) Prior Publication Data

US 2010/0082762 A1  Apr. 1, 2010

(30) Foreign Application Priority Data

Sep. 29, 2008 (JP) ................................. 2008-249638
Jun. 11, 2009 (JP) ................................. 2009-139808

(51) Int. Cl.
*G06F 15/16* (2006.01)
*G06F 15/173* (2006.01)

(52) U.S. Cl.
USPC .......................................... 709/207; 709/238

(58) Field of Classification Search
USPC ........................................................ 709/227
See application file for complete search history.

(56) References Cited

U.S. PATENT DOCUMENTS

| | | | | |
|---|---|---|---|---|
| 4,466,060 A | * | 8/1984 | Riddle | 709/242 |
| 5,089,954 A | * | 2/1992 | Rago | 1/1 |
| 5,253,248 A | * | 10/1993 | Dravida et al. | 370/228 |
| 5,537,394 A | * | 7/1996 | Abe et al. | 370/252 |
| 5,687,319 A | * | 11/1997 | Cook et al. | 370/256 |
| 5,940,372 A | * | 8/1999 | Bertin et al. | 370/238 |
| 6,072,806 A | * | 6/2000 | Khouri et al. | 370/465 |
| 6,115,462 A | * | 9/2000 | Servi et al. | 379/221.06 |
| 6,175,870 B1 | * | 1/2001 | Gawlick et al. | 709/227 |
| 6,363,319 B1 | * | 3/2002 | Hsu | 701/202 |
| 6,370,560 B1 | * | 4/2002 | Robertazzi et al. | 718/105 |
| 6,501,754 B1 | * | 12/2002 | Ohba et al. | 370/389 |

(Continued)

FOREIGN PATENT DOCUMENTS

| | | | | |
|---|---|---|---|---|
| JP | 02-031269 A | * | 2/1990 | |
| JP | 02031269 A | * | 2/1990 | |

(Continued)

OTHER PUBLICATIONS

Murthy and Garcai-Luna-Aceves, Loop-Free Internet Routing Using Hierarchical Routing Trees.*

(Continued)

*Primary Examiner* — Emmanuel L Moise
*Assistant Examiner* — Robert Shaw
(74) *Attorney, Agent, or Firm* — Staas & Halsey LLP

(57) ABSTRACT

This message tying processing method include: extracting tying keys from a key definition database storing, for each protocol, tying keys included in messages relating to the protocol and used in a message tying processing, and generating data of a structure including nodes respectively corresponding to the extracted tying keys and links connecting between the nodes of the tying keys belonging to the same protocol: judging whether or not a loop is formed in the structure by the links; when it is judged that the loop is not formed in the structure, identifying, among allocation patterns that are combinations of allocation of the tying keys to each of plural tying processors, that respectively carry out the tying processing in cooperation with each other, an allocation pattern satisfying a first condition that a communication load between the tying processors is the minimum.

8 Claims, 15 Drawing Sheets

(56) References Cited

U.S. PATENT DOCUMENTS

| | | | |
|---|---|---|---|
| 6,697,333 B1* | 2/2004 | Bawa et al. | 370/238 |
| 6,725,253 B1* | 4/2004 | Okano et al. | 709/203 |
| 6,775,706 B1* | 8/2004 | Fukumoto et al. | 709/230 |
| 6,941,360 B1* | 9/2005 | Srivastava et al. | 709/223 |
| 7,062,556 B1* | 6/2006 | Chen et al. | 709/226 |
| 7,480,660 B1* | 1/2009 | Black | 1/1 |
| 7,661,106 B1* | 2/2010 | Ankireddipally et al. | 718/101 |
| 2002/0067720 A1* | 6/2002 | Garcia-Luna-Aceves et al. | 370/389 |
| 2002/0116251 A1* | 8/2002 | Chen et al. | 705/10 |
| 2003/0097468 A1* | 5/2003 | Hamadi | 709/238 |
| 2003/0179718 A1* | 9/2003 | Ebata et al. | 370/255 |
| 2004/0249781 A1* | 12/2004 | Anderson | 707/1 |
| 2005/0038909 A1* | 2/2005 | Yoshiba et al. | 709/241 |
| 2005/0063321 A1* | 3/2005 | Imai | 370/256 |
| 2005/0160171 A1* | 7/2005 | Rabie et al. | 709/227 |
| 2005/0174936 A1* | 8/2005 | Betker | 370/230 |
| 2005/0188073 A1* | 8/2005 | Nakamichi et al. | 709/223 |
| 2006/0112388 A1* | 5/2006 | Taniguchi et al. | 718/100 |
| 2006/0120346 A1* | 6/2006 | Kitamura et al. | 370/351 |
| 2006/0230160 A1* | 10/2006 | Dinkel et al. | 709/228 |
| 2007/0294408 A1* | 12/2007 | Jackson | 709/226 |
| 2008/0025203 A1* | 1/2008 | Tallet | 370/216 |
| 2008/0049620 A1* | 2/2008 | Riga et al. | 370/236 |
| 2009/0089408 A1* | 4/2009 | Bou-Diab et al. | 709/220 |

FOREIGN PATENT DOCUMENTS

| | | | |
|---|---|---|---|
| JP | 5-61697 | | 3/1993 |
| JP | 05-061697 A | * | 3/1993 |
| JP | 08-030558 | | 2/1996 |
| JP | 08-030558 A | * | 2/1996 |
| JP | 08-115244 | | 5/1996 |
| JP | 08-115244 A | * | 7/1996 |
| JP | 11-53323 | | 2/1999 |
| JP | 11-053323 A | * | 2/1999 |
| JP | 11-134307 | | 5/1999 |
| JP | 11-134307 A | * | 5/1999 |
| JP | 11-272623 A | * | 8/1999 |
| JP | 11-272623 | | 10/1999 |
| JP | 2002064536 | * | 2/2002 |
| JP | 2002064563 | * | 2/2002 |
| JP | 2007-172537 A | * | 7/2007 |

OTHER PUBLICATIONS

C. L. Liu and J. W. Layland, Scheduling algorithms for multiprogramming in a hard real-time environment. Journal of the ACM, 20(1), 1973.*

Capello and Mourloukos—A Scalable, Robust Network for Parallel Computing, Proceedings of the 2001 joint ACM-ISCOPE conference on Java Grande, ACM, 2001.*

Campos et al Computing quantitative characteristics of finite-state real-time systems in: Real-Time Systems Symposium, Proceedings. 1994 pp. 266-270.*

Murthy and Garcai-Luna-Aceves, Loop-Free Internet Routing Using Hierarchical Routing Trees, Proceedings of the INFOCOM '97 (1997).*

Liu and Layland, Scheduling algorithms for multiprogramming in a hard real-time environment. Journal of the ACM, 20(1), 1973.*

Sahai et al, End-to-End E-service Transaction and Conversation Management through Distributed Correlation, HPL-2000-145, (2000).*

Subhlok et al Automatic Node Selection for High Performance Applications on Networks, in: Proceedings of the seventh ACM SIGPLAN symposium on Principles and practice of parallel programming (PPoPP '99), ACM, 1999.*

Chen and Maheswaran, Distributed Dynamic Scheduling of Composite Tasks on Grid Computing Systems in: Proceedings, International Parallel and Distributed Processing Symposium (IPDPS) 2002.*

Kafil and Ahmad, Optimal Task Assignment in Heterogeneous Distributed Computing Systems, IEEE Concurrency, 1998, pp. 42-51.*

Capello et al—A Scalable, Robust Network for Parallel Computing, Proceedings of the 2001 Joint ACM-ISCOPE conference on Java Grande, ACM, 2001.*

Murthy et al, "Loop-Free Internet Routing Using Hierarchical Routing Trees". Proceedings of the INFOCOM '97, (1997).*

* cited by examiner

| SERVER ID | PROCESSING CAPABILITY |
|---|---|
| 1 | 2 |
| 2 | 2 |
| 3 | 3 |
| ... | ... |

| PROTOCOL | KEY |
|---|---|
| P1 | Kx, Ka |
| P2 | Ka, Kb |
| P3 | Kb, Kc |
| P4 | Kc, Kd |
| P5 | Kd, Ky |
| P6 | Kc, Ke |
| P7 | Ke, Kf |
| P8 | Kf, Kz |
| P9 | Ke, Kg |
| P10 | Kb, Kg |
| ... | ... |

FIG.8

| SERVER ID | KEY |
|---|---|
| 1 | Ka, Kb |
| 2 | Kc, Kd |
| 3 | Ke, Kf, Kg |

FIG.9

| KEY | PRIORITY |
|---|---|
| Ka | 1 |
| Kb | 2 |
| Kc | 3 |
| Kd | 4 |
| Ke | 5 |
| Kf | 6 |
| Kg | 7 |

| SERVER ID | PROCESSING CAPABILITY |
|---|---|
| 1 | 2 |
| 2 | 2 |
| 3 | 3 |
| TOTAL | |

PATTERN 1

| KEY ALLOCATION | INDIVIDUAL PROCESSING AMOUNT | COMMUNICATION LOAD | PROCESSING AMOUNT | OPERATION RATIO |
|---|---|---|---|---|
| Ka, Kb | 2 | | | |
| Kc, Kd | 2 | | | |
| Ke, Kf, Kg | 3 | | | |

PATTERN 2

| KEY ALLOCATION | INDIVIDUAL PROCESSING AMOUNT | COMMUNICATION LOAD | PROCESSING AMOUNT | OPERATION RATIO |
|---|---|---|---|---|
| Ka, Kb | 2 | | | |
| Kc, Ke | 2 | | | |
| Kd, Kf, Kg | 3 | | | |

PATTERN 3

| KEY ALLOCATION | INDIVIDUAL PROCESSING AMOUNT | COMMUNICATION LOAD | PROCESSING AMOUNT | OPERATION RATIO |
|---|---|---|---|---|
| Ka, Kb | 2 | | | |
| Kc, Kf | 2 | | | |
| Kd, Ke, Kg | 3 | | | |

⋮

PATTERN 1

| SERVER ID | PROCESSING CAPABILITY | KEY ALLOCATION | INDIVIDUAL PROCESSING AMOUNT | COMMUNICATION LOAD | PROCESSING AMOUNT | OPERATION RATIO |
|---|---|---|---|---|---|---|
| 1 | 2 | Ka, Kb | 2 | 0.5 | 2.5 | 125% |
| 2 | 2 | Kc, Kd | 2 | 1 | 3 | 150% |
| 3 | 3 | Ke, Kf, Kg | 3 | 0.5 | 3.5 | 117% |
| TOTAL | | | | 2 | | |

PATTERN 2

| KEY ALLOCATION | INDIVIDUAL PROCESSING AMOUNT | COMMUNICATION LOAD | PROCESSING AMOUNT | OPERATION RATIO |
|---|---|---|---|---|
| Ka, Kb | 2 | 0.5 | 2.5 | 125% |
| Kc, Ke | 2 | 2 | 4 | 200% |
| Kd, Kf, Kg | 3 | 1.5 | 4.5 | 150% |
| | | 4 | | |

PATTERN 3

| KEY ALLOCATION | INDIVIDUAL PROCESSING AMOUNT | COMMUNICATION LOAD | PROCESSING AMOUNT | OPERATION RATIO |
|---|---|---|---|---|
| Ka, Kb | 2 | 0.5 | 2.5 | 125% |
| Kc, Kf | 2 | 2 | 4 | 200% |
| Kd, Ke, Kg | 3 | 1.5 | 4.5 | 150% |
| | | 4 | | |

FIG.21

FIG.22A
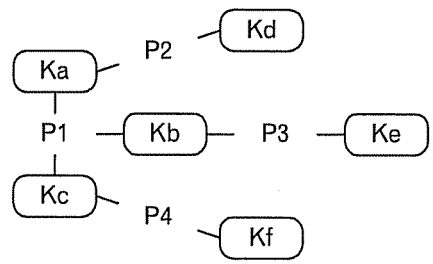
FIG.22B
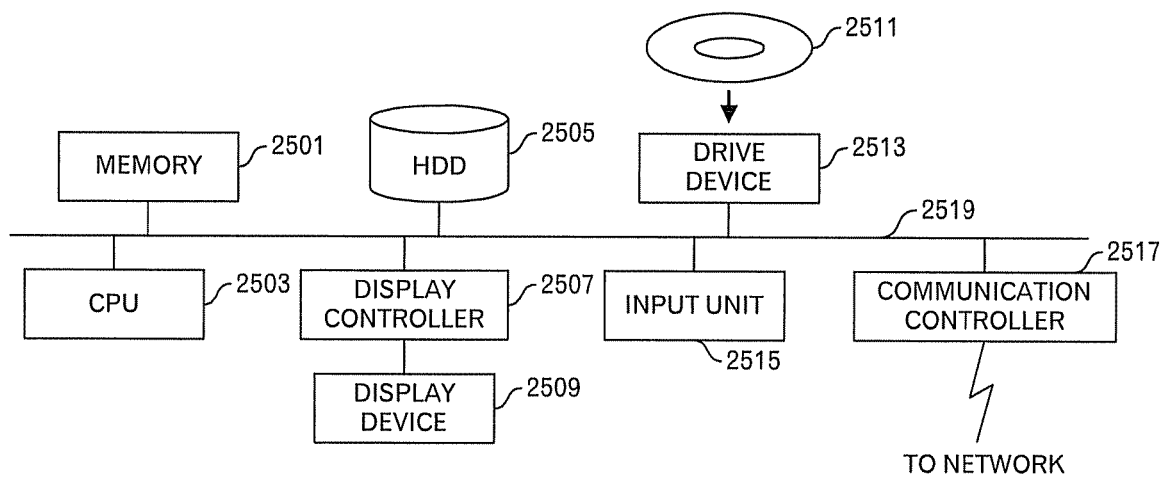
FIG.23

US 8,539,035 B2

MESSAGE TYING PROCESSING METHOD AND APPARATUS

CROSS-REFERENCE TO RELATED APPLICATIONS

This application is based upon and claims the benefit of priority of the prior Japanese Patent Applications No. 2008-249638, filed on Sep. 29, 2008, and the Japanese Patent Application No. 2009-139808, filed on Jun. 11, 2009, the entire contents of which are incorporated herein by reference.

FIELD

This technique relates to a technique for parallelizing a message tying processing.

BACKGROUND

For example, in a system having plural servers such as an electronic commerce system, when a request is received from a client, messages are exchanged between the servers to proceed with the processing.

On the other hand, in order to monitor the operation of such a system or analyze a request delay problem, a processing (hereinafter, referred to a tying processing) to tie the messages for each transaction is carried out. Incidentally, the messages required for a response to one request are recognized as one transaction according to keywords (hereinafter, referred to a tying key) included in the messages.

For example, in order to process a large number of messages at high speed, a configuration that plural tying servers that carries out the message tying processing are operated in parallel may be considered. However, in a case where the parallel processing is simply carried out, the number of times of the communication between the tying servers to carry out the tying processing may increase, and in such a case, there is a problem that the communication load prevents from improving the efficiency of the processing by the parallelization. Incidentally, the conventional technique cannot parallelize the message tying processing while suppressing the communication load of the tying servers.

Namely, the conventional technique cannot parallelize the message tying processing while minimizing the communication load between the tying servers.

SUMMARY

This message tying processing method include: extracting tying keys from a key definition database storing, for each protocol, tying keys included in messages relating to the protocol and used in a message tying processing, and generating data of a structure including nodes respectively corresponding to the extracted tying keys and links connecting between the nodes of the tying keys belonging to the same protocol: judging whether or not a loop is formed in the structure by the plural links; when it is judged that the loop is not formed in the structure, identifying, among allocation patterns that are combinations of allocation of the tying keys to each of plural tying processing units that respectively carry out the tying processing in cooperation with each other, an allocation pattern satisfying a predetermined condition including a first condition that a communication load between the tying processing units is the minimum, and storing allocation data relating to the identified allocation pattern into a key information storage device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a diagram depicting an example of data stored in a key definition

FIG. 9 is a diagram depicting an example of data stored in a key allocation storage;

FIG. 10 is a diagram depicting an example of data store in a key priority storage;

FIG. 19 is a diagram depicting an example of an allocation pattern table;

FIG. 21 is a diagram depicting another example of the allocation pattern table;

FIGS. 22A and 22B are diagram to explain a processing in a case where the number of tying keys is "3"; and FIG. 23 is a functional block diagram of a computer.

DESCRIPTION OF EMBODIMENTS

Figure 1:
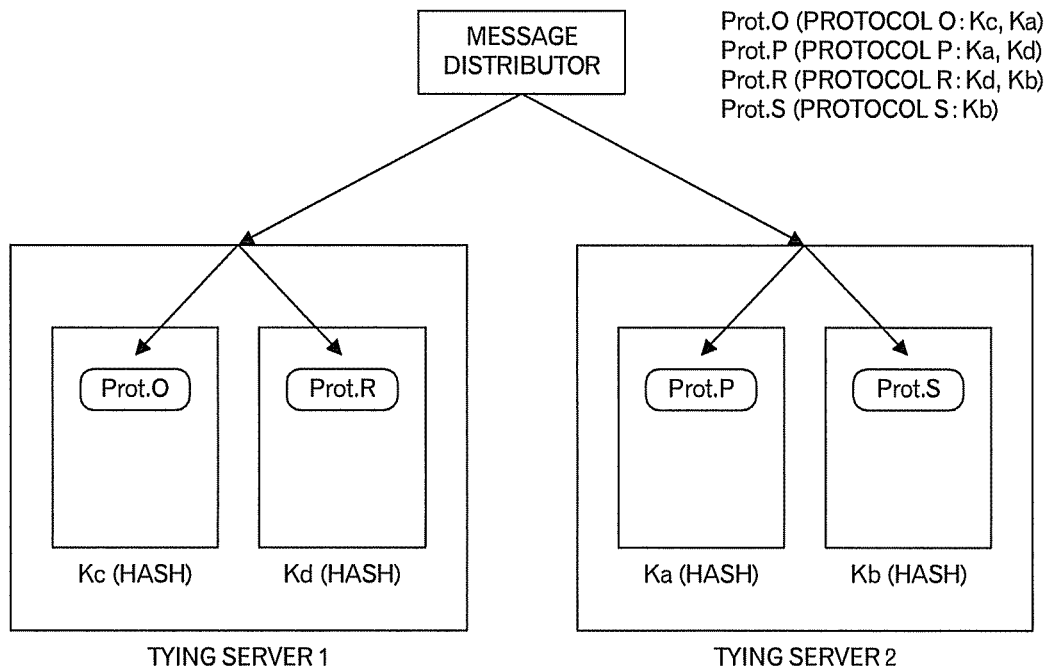
FIG. 1 is a diagram to explain a message tying processing, which is presupposition of this embodiment.

First, the message tying processing that is presupposition of this embodiment will be explained. For example, as depicted in FIG. 1, a message distributor allocates messages (Prot.O) of a protocol O and messages (Prot.R) of a protocol R to a tying server 1 to which the tying keys Kc and Kd are allocated, and allocates messages (Prot. P) of a protocol P and message (Prot. S) of a protocol S to a tying server 2 to which the tying keys Ka and Kb are allocated. In addition, the tying servers 1 and 2 have a hash table for each allocated tying key, and when a message is received from the message distributor, a hash value is calculated from the tying key, and the message is stored into the hash table according to the hash value. Incidentally, Prot.O includes the tying keys Kc and Ka, Prot. P includes the tying keys Ka and Kd, Prot.R includes the tying keys Kd and Kb and Prot.S includes the tying key Kb. Namely, Prot.O and Prot.P are tied by the tying key Ka. In addition, Prot.P and Prot.R are tied by the tying key Kd. Furthermore, Prot. R and Prot. S are tied by the tying key Nb. Therefore, Prot.O, Prot.P, Prot.R and Prot.S are tied as messages relating to the same transaction.

Figure 2:
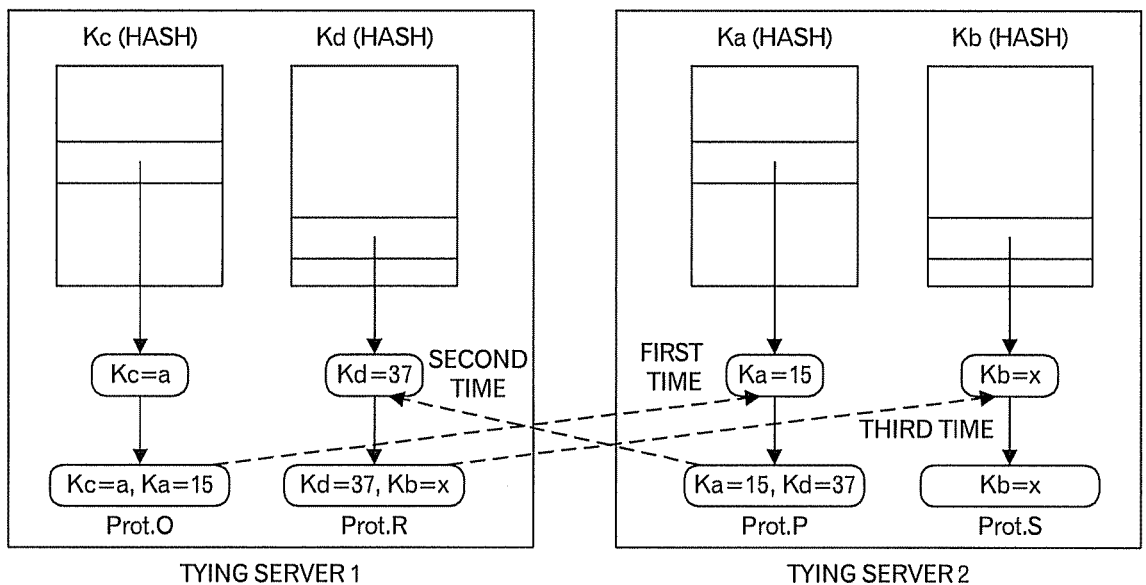
FIG. 2 is a diagram to explain a message tying processing, which is presupposition of this embodiment.

For example, as depicted in FIG. 2, the message tying processing is carried out. Specifically, first, the tying server 1 reads out Prot.O (Kc=a, Ka=15) from the hash table (Kc). Here, Prot.O is tied with Prot.P by the tying key Ka. However, because the tying server 2 stores Prot.P, the communication between the tying servers occurs (i.e. first time). Next, the tying server 2 reads out Prot.P (Ka=15, Kd=37) tied with Prot.O from the hash table (Ka). Here, Prot.P is tied with Prot.R by the tying key Kd. However, because the tying server 1 stores Prot. R, the communication between the tying servers occurs again (i.e. second time). Then, the tying server 1 reads out Prot.R (Kd=37, Kb=x) tied with Prot.P from the hash table (Kd). Here, Prot.R is tied with Prot.S by the tying key Kb. However, because the tying server 2 stores Prot.S, the communication between the tying servers occurs again (i.e. third time). Then, the tying server 2 reads out Prot.S (Kb=x) tied with Prot.R from the hash table (Kb), and the tying processing is completed. Namely, when the tying keys are allocated as depicted in FIG. 1, the communication between the tying servers is required three times for the tying processing. Incidentally, although an example that the number of tying keys is four is depicted in FIGS. 1 and 2, the number of times of the communication between the tying servers increases as the number of tying keys increases, and the communication load prevents from improving the efficiency of the processing by the parallelization.

Figure 3:
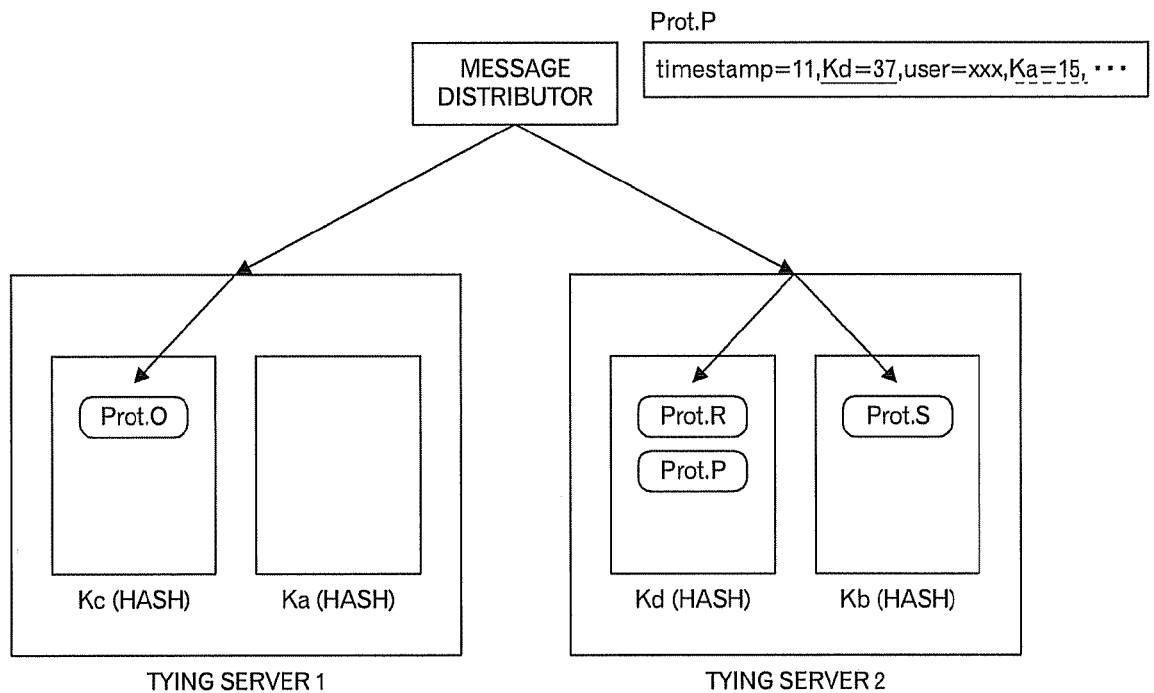
FIG. 3 is a diagram to explain a message tying processing, which is presupposition of this embodiment.
Figure 4:
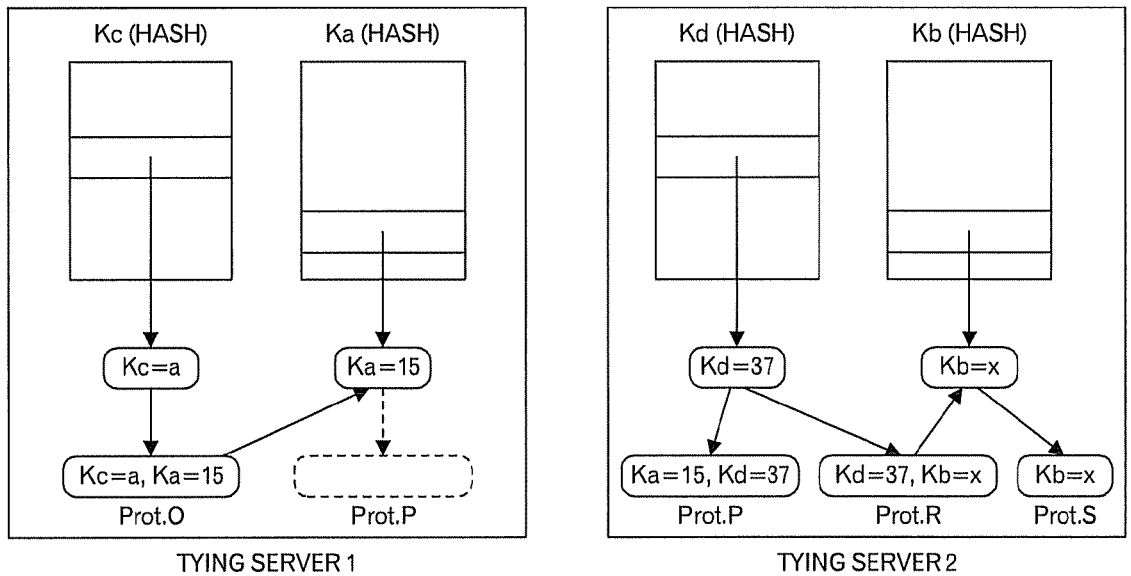
FIG. 4 is a diagram to explain a problem in the message tying processing, which is presupposition of this embodiment.

In addition, as depicted in FIG. 3, when the message distributor allocates a message including plural tying keys, for example, according to the tying key firstly detected in the message, a problem as depicted in FIG. 4 occurs. Incidentally, in FIG. 3, the tying keys Kc and Ka are allocated to the tying server 1, and the tying keys Kd and Kb are allocated to the tying server 2. In addition, in FIG. 3, the tying key Kd is detected earlier than the tying key Ka, and Prot.P are allocated to the tying server 2 according to the tying key Kd.

When the message tying processing is carried out in this state, the tying server 1 reads out Prot.O from the hash table of the tying key Kc as depicted in FIG. 4. However, because Prot.P is not registered in the hash table of the tying key Ka in the tying server 1, the tying server 1 cannot find out Prot.P to be tied with Prot.O. In such a case, by also registering the Prot.P into the hash table of the tying key Ka, it becomes possible to carry out the tying processing. However, it is necessary to secure an additional region in the hash table, the communication load for the message copy is required, and the parallelization is prevented by those problems.

Figures 5, 7:
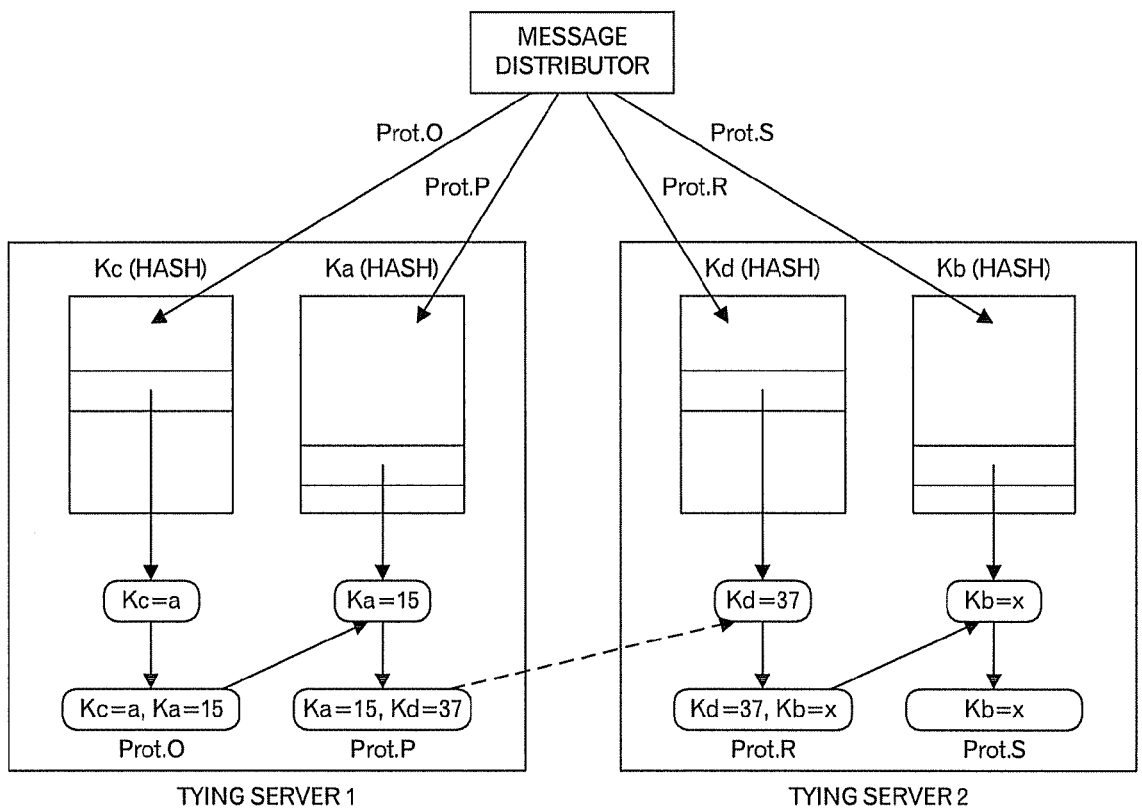
FIG. 5 is a diagram to explain an outline of this embodiment.
FIG. 7 is a diagram depicting an example of data stored in a server DB.

Then, in this embodiment, an allocation pattern satisfying a predetermined condition (e.g. operation ratios of the respective tying servers) and minimizing the communication load between the tying servers is identified among allocation patterns of the tying keys, and the allocation of the tying keys to the respective tying servers is optimized according to the identified allocation pattern. For example, the key allocation is carried out as depicted in FIG. 5. In FIG. 5, the tying keys Kc and Ka are allocated to the tying server 1, and the tying keys Kd and Kb are allocated to the tying server 2. Furthermore, the priority of the tying key is determined so as not to duplicately register the messages including the plural tying keys. For example, when the tying processing is carried out in an order of Prot.O(Kc,Ka) ->Prot.P(Ka,Kd) ->Prot.R(Kd, Kb) ->Prot.S(Kb), the priority is assigned in an order of Kc (=1), Ka (=2), Kd (=3) and Kb (=4). Then, when the message distributor allocates the messages according to the priorities, for example, Prot.P is allocated to the tying server 1 because the priority of Ka is higher than that of Kd. Thus, it becomes possible to carry out the tying processing without duplicately registering the messages, the number of times of the communication is reduced from three times in FIG. 2 to once. In the following, a specific embodiment of this technique will be explained.

First, a system outline of a message tying processing apparatus relating to this embodiment will be explained by using FIG. 6. The message tying processing apparatus in this embodiment has a server DB 101 storing processing capabilities of the respective tying processors and the like; a key definition DB 103 storing, for each protocol, the tying keys included in the messages relating to the pertinent protocol; a key allocation optimizer 105 to identify an allocation pattern satisfying a predetermined condition and minimizing the communication load between the tying processors (i.e. the tying servers) among allocation patterns of the tying keys based on data stored in the server DB 101 and the key definition DB 103; a key allocation storage 107 storing key allocation relating to the allocation pattern identified by the key allocation optimizer 105; a key priority determination unit 109 to determine the priorities of the respective tying keys based on the key allocation stored in the key allocation storage 107; a key priority storage 111 storing the priorities of the tying keys, which are determined by the key priority determination unit 109; a message receiver 113 to receive the messages relating to the respective transactions; a message distributor 115 to allocate the messages received by the message receiver 113 to the tying processor in charge according to the priority stored in the key allocation storage 107 and the priority stored in the key priority storage 111; and the tying processors 117 to 121 that respectively have the hash table for each tying key to be handled and carry out the message tying processing in cooperation with each other. Incidentally, the tying processors 117 and 121 (also called "tying processing unit") may be configured on different servers, for example.

In addition, the key allocation optimizer 105 has a structure processor 1051 to extract the respective tying keys from the key definition DB 103 and carry out a processing associated with data of a structure including, as nodes, the respective tying keys and links connecting between the nodes of the tying keys belonging to the same protocol; and a pattern identifying unit 1053 to identify the allocation pattern satisfying the predetermined condition and minimizing the communication load between the tying processors (i.e. tying servers) among the allocation patterns of the tying keys.

FIG. 7 depicts an example of data stored in the server DB 101. In the example of FIG. 7, the server DB 101 includes a column of a server (i.e. tying processor) ID and a column of a processing capability. A value representing a relative processing capability of the tying server (i.e. tying processor) is stored in the column of the processing capability.

FIG. 8 depicts an example of data stored in the key definition DB 103. In the example of FIG. 8, the key definition DB 103 includes a column of a protocol and a column of a key (i.e. tying key).

FIG. 9 depicts an example of data stored in the key allocation storage 107. In the example of FIG. 9, the key allocation storage 107 includes a column of a server (i.e. tying processor) and a column of a key (i.e. tying key). The tying key to be allocated to the tying server (i.e. tying processor) is stored in the column of the key. Incidentally, data of the structure corresponding to the key allocation and the minimum communication load, which will be explained later, are stored together into the key allocation storage 107.

FIG. 10 depicts an example of data stored in the key priority storage 111. In the example of FIG. 10, the key priority storage 111 includes a column of the key (i.e. tying key) and a column of the priority.

Figure 11:
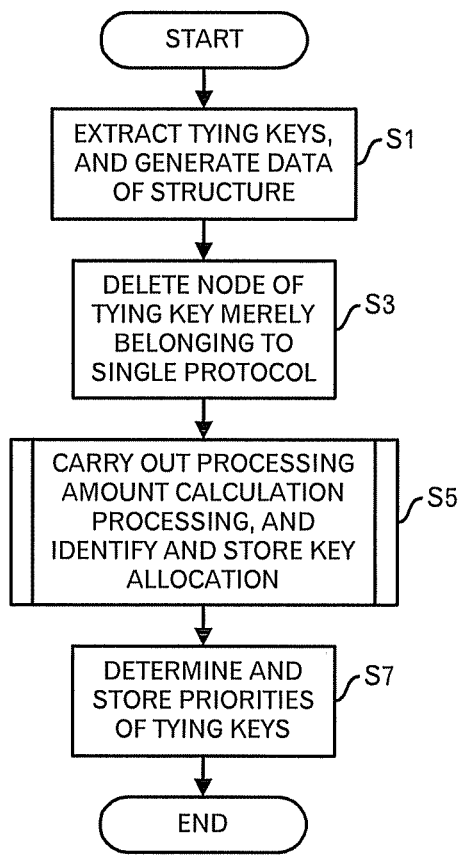
FIG. 11 is a diagram depicting a main processing flow in this embodiment.
Figure 12:
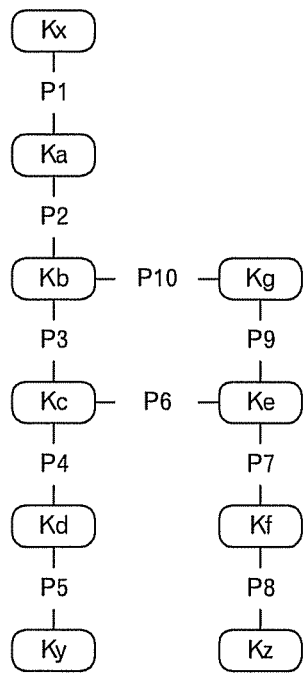
FIG. 12 is a diagram depicting an example of a structure in this embodiment.

Next, a processing content of the message tying processing apparatus depicted in FIG. 6 will be explained by using FIGS. 11 to 21. Incidentally, in this embodiment, a case where three tying servers 1 to 3 exist will be explained as an example. First, a structure processor 1051 extracts the respective tying keys from the key definition DB 103, generates data of the structure including the respective tying keys as nodes and links connecting the nodes of the tying keys belonging to the same protocol, and stores the data of the structure into a storage device such as a main memory (FIG. 11: step S1). For example, in a case where data (i.e. P1 to P10), for example, as depicted in FIG. 8 is stored in the key definition DB 103, when the processing at this step is carried out, the data of the structure as depicted in FIG. 12 is generated. In the structure as depicted in FIG. 12 includes the nodes of the tying keys Kx, Ka, Kb, Kc, Kd, Ke, Kf, Kg, Ky and Kz in the key definition DB 103 (FIG. 8). Furthermore, the structure depicted in FIG. 12 includes links P1 to P10 respectively corresponding to the protocols P1 to P10 in the key definition DB 103. Incidentally, the link P1 is a link connecting between the nodes of the tying keys Kx and Ka belonging to the protocol P1. In addition, the link P2 is a link connecting between the nodes of the tying keys Ka and Kb belonging to the protocol P2. Furthermore, the link P3 is a link connecting between the nodes of the tying keys Kb and Kc belonging to the protocol P3. In addition, the link P4 is a link connecting between the nodes of the tying keys Kc and Kd belonging to the protocol P4. Furthermore, the link P5 is a link connecting between the nodes of the tying keys Kd and Ky belonging to the protocol P5. In addition, the link PG is a link connecting between the nodes of the tying keys Kc and Ke belonging to the protocol P6. Furthermore, the link P7 is a link connecting between the nodes of the tying keys Ke and Kf belonging to the protocol P7. In addition, the link P8 is a link connecting between the nodes of the tying keys Kf and Kz belonging to the protocol P8. Furthermore, the link P9 is a link connecting between the nodes of the tying keys Ke and Kg belonging to the protocol P9. In addition, the link P10 is a link connecting between the nodes of the tying keys Kb and Kg belonging to the protocol P10.

Figure 13:
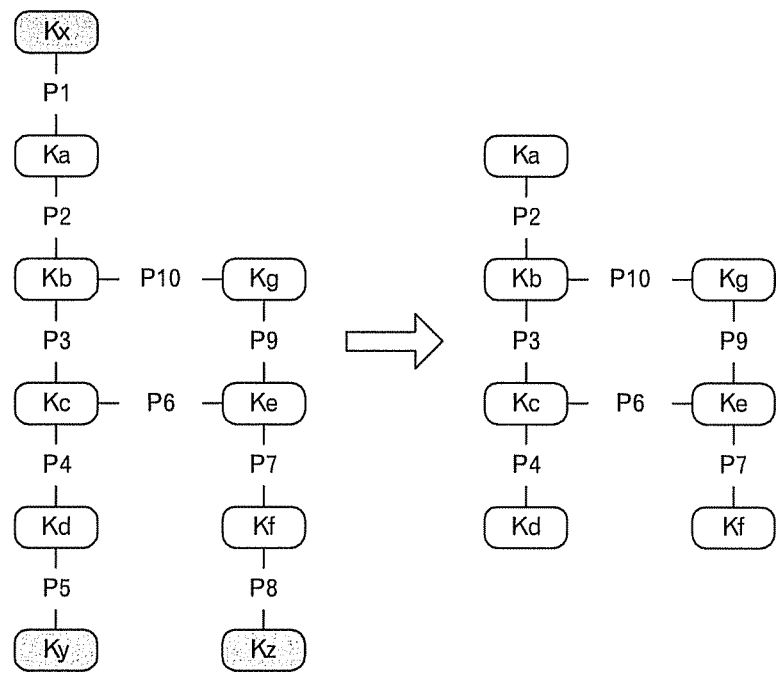
FIG. 13 is a diagram depicting an example of the structure in this embodiment.

Then, the structure processor 1051 deletes the nodes of the tying keys merely belonging to the single protocol from the structure (step S3). Incidentally, in FIG. 8, the tying key Kx is included only in the protocol P1. the tying key Ky is included only in the protocol P5 and the tying key Kz is included only in the protocol P8. Therefore, the nodes of the tying keys Kx, Ky and Kz are deleted from the structure depicted in FIG. 12, and the structure as depicted in the right side of FIG. 13 is obtained. Incidentally, the structure in the right side of FIG. 13 includes the nodes of the tying keys Ka, Kb, Kc, Kd, Ke, Kf and Kg.

Then, the structure processor 1051 and the pattern identifying unit 1053 carries out a processing amount calculation processing by using data stored in the server DB 101 and the data of the structure, which is stored in the storage device, to identify the key allocation, and stores the identified key allocation into the key allocation storage 107 (step S5).

Figure 14:
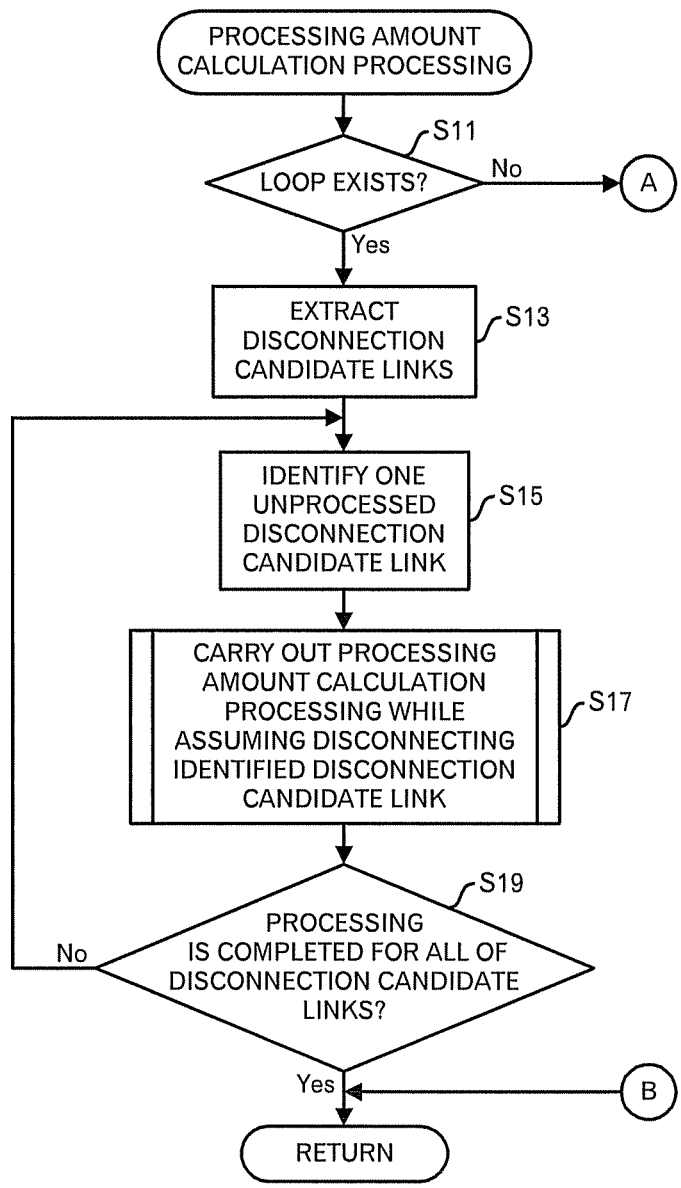
FIG. 14 is a diagram depicting a first portion of a processing flow of a processing amount calculation processing.

The processing amount calculation processing will be explained by using FIGS. 14 to 21. First, the structure processor 1051 analyzes the data of the structure, which is stored in the storage device, and judges whether or not a loop exists in the structure (FIG. 14: step S11). For example, the structure processor 1051 traces the links included in the structure to detect each node, and sets a flag to the detected node. Then, when the node to which the flag has been set is detected again, it can be determined that the loop exists. When it is judged that no loop exists in the structure (step S11: No route), the processing shifts to a processing of step S21 in FIG. 18 through a terminal A. Incidentally, the processing of FIG. 18 will be explained later.

Figure 15:
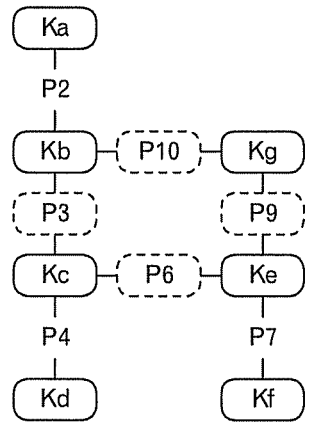
FIG. 15 is a diagram depicting an example of the structure in this embodiment.

On the other hand, when it is judged that the loop exists in the structure (step S11: Yes route), the structure processor 1051 extracts the links included in the loop as disconnection candidate links (step S13). For example, as depicted in FIG. 15, when a loop is formed by the link P3 connecting the tying keys Kb and Kc, the link P6 connecting the tying keys Kc and Ke, the link P9 connecting the tying keys Ke and Kg and the links P10 connecting the tying keys Kg and Kb, the links P3, P6, P9 and P10 are extracted as the disconnection candidate links.

Figure 16:
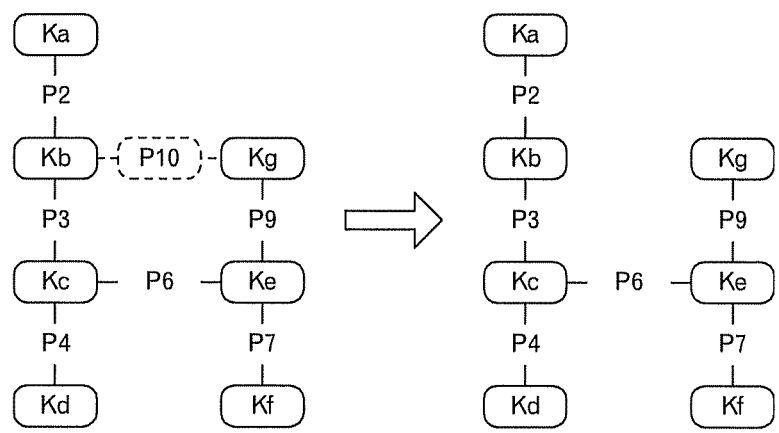
FIG. 16 is a diagram depicting an example of the structure in this embodiment.

Then, the structure processor 1051 identifies one unprocessed disconnection candidate link among the extracted disconnection candidate links (step S15). Here, it is presupposed that the link P10 is identified, for example. Then, the structure processor 1051 recursively carries out the processing amount calculation processing while assuming the identified disconnection candidate link is disconnected (step S17). For example, when the link P10 is disconnected, the structure as depicted in the right side of FIG. 16 is obtained, and the processing amount calculation processing is carried out for this structure again. Incidentally, when the processing of step S17 is completed, the identified disconnection candidate link is assumed to be connected again.

Figure 17A:
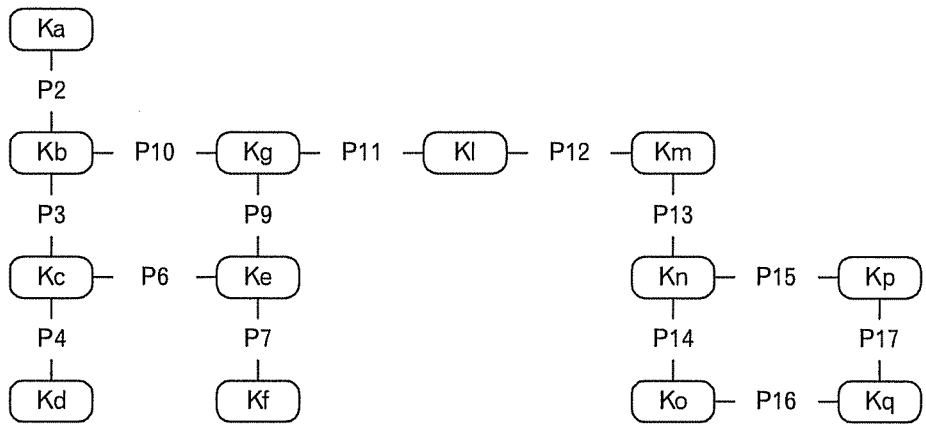
FIGS. 17A to 17C are diagrams to explain a case where the processing amount calculation processing is carried out, recursively.
Figure 17B:
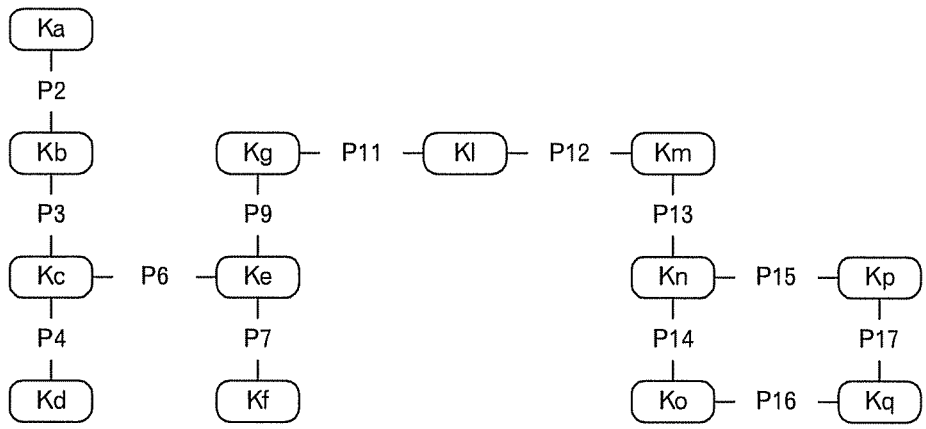
Figure 17C:
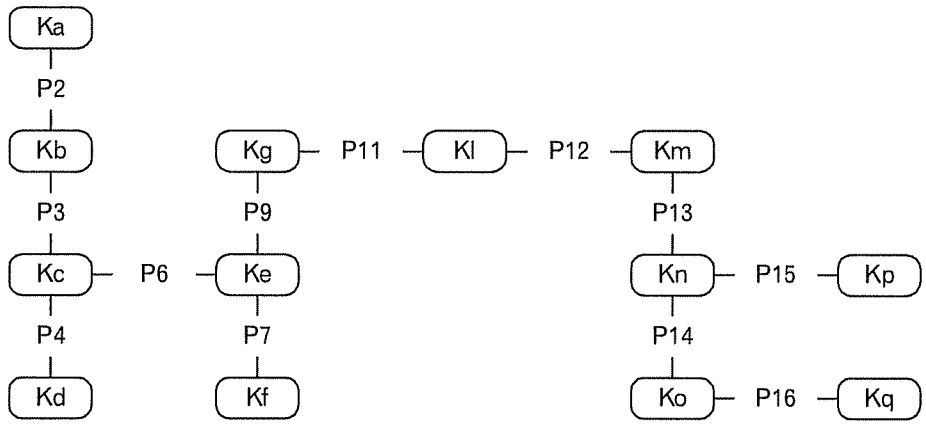

Incidentally, the number of loops formed in the structure is not limited to one. For example, when two loops are formed as depicted in FIG. 17A, the disconnection candidate link (here, it is presupposed that the link P10 is identified) is identified for the loop formed by the links P3, P6, P9 and P10, and the processing amount calculation processing is carried out while assuming the link P10 is disconnected. Incidentally, when the link P10 is disconnected, the structure as depicted in FIG. 17B is obtained. Next, in the structure of FIG. 17B, the disconnection candidate links for the loop formed by the links P14, P16, P17 and P15 are identified (here, it is presupposed that the link P17 is identified.) and the processing amount calculation processing is further carried out while assuming the link P17 is disconnected. Incidentally, when the link P17 is disconnected, the structure as depicted in FIG. 17C is obtained. In the structure of FIG. 17C, no loop is formed. Thus, until the loop in the structure disappears, the processing amount calculation processing is carried out, recursively.

Then, the structure processor 1051 judges whether or not the processing for all of the disconnection candidate links has been completed (step S19). When the processing for all of the disconnection candidate links has not been completed (step S19: No route), the processing returns to the processing at the step S15. On the other hand, when the processing for all of the disconnection candidate link has been completed (step S19: Yes route), the processing returns to the calling source processing.

Figure 18:
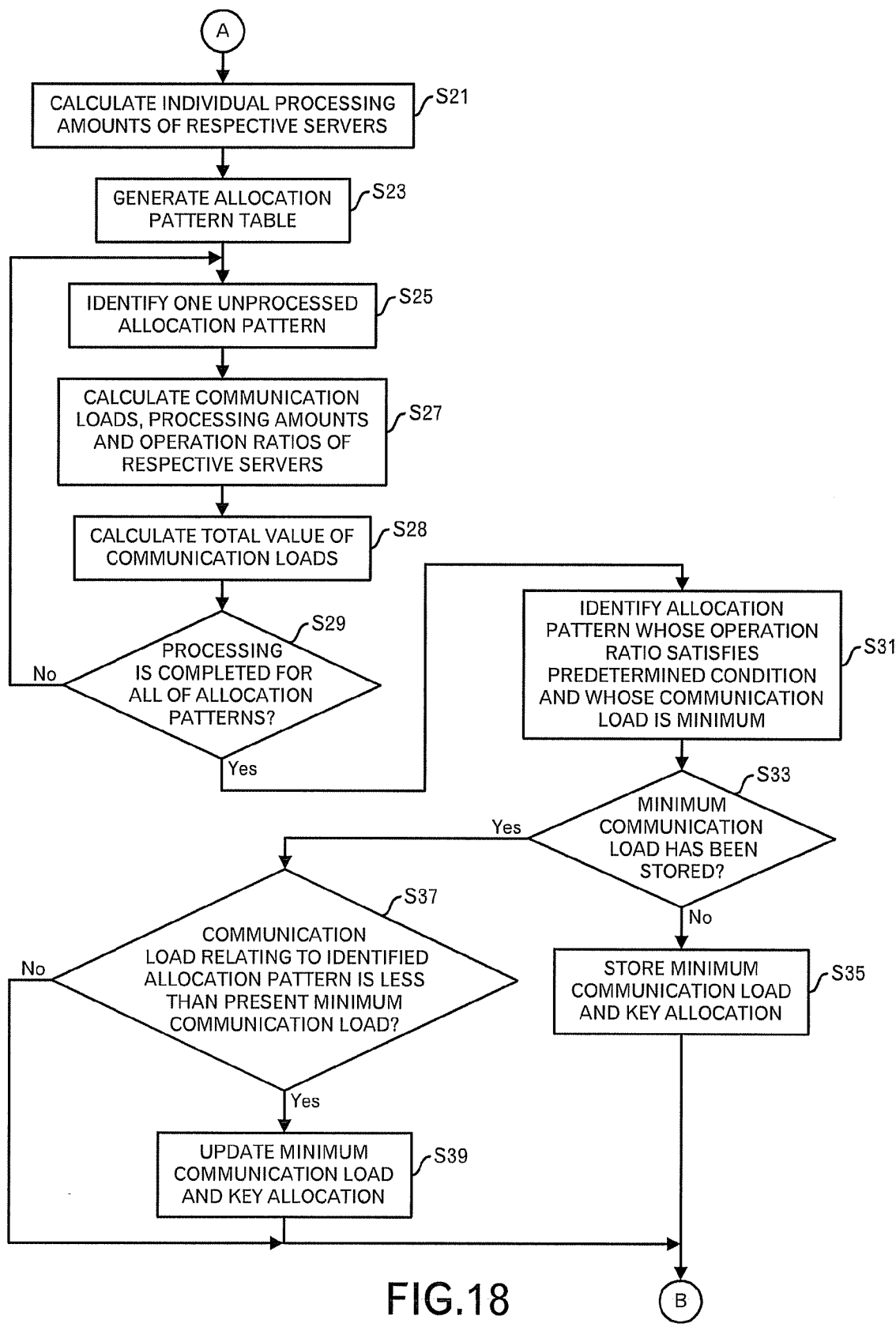
FIG. 18 is a diagram depicting a second portion of the processing flow of the processing amount calculation processing.

Next, the processing after the terminal A will be explained by using FIG. 18. Incidentally, a case where the structure depicted in the right side of FIG. 16 is processed will be explained as an example. First, the pattern identifying unit 1053 calculates an individual processing amount of each tying server (i.e. tying processor) based on the number of nodes (i.e. tying keys) included in the structure and the processing capabilities of the respective tying servers, which are stored in the server DB 101, and stores the individual processing amounts into the storage device such as the main memory (FIG. 18: step S21) Specifically, the pattern identifying unit 1053 calculates the entire processing capability by adding all of the processing capabilities of the respective tying servers, and calculates "(the total number of nodes)* (the processing capability of the tying server n) (the entire processing capability)" as the individual processing amount of required for the tying server n (i.e. the number of the tying keys allocated to the tying server b). For example, when data as depicted in FIG. 7 is stored in the server DB 101 for the tying servers 1 to 3, the entire processing capability is "7(=2+2+3)". In addition, in the structure depicted in the right side of FIG. 16, 7 nodes (the respective nodes of the tying keys Ka, Kb, Kc, Kd, Ke, Kf and Kg) are included. Therefore, the individual processing amount of the tying server 1 is "2(=7*2/7)", the individual processing amount of the tying server 2 is "2(=7*2/7)", and the individual processing amount of the tying server 3 is "3(=7*3/7)".

Then, the pattern identifying unit 1053 generates an allocation pattern table, and stores the table into the storage device such as the main memory (step S23). Specifically, the pattern identifying unit 1053 extracts all allocation patterns that are all combinations of the tying keys in a case where the tying keys are allocated to the respective server according to the individual processing amounts calculated at the step S21, and generates the allocation pattern table including all of the allocation patterns. FIG. 19 depicts an example of the allocation pattern table. In the example of FIG. 19, the allocation pattern table includes a column of the server (i.e. tying processor) ID, a column of the processing capability, a column of a pattern 1, a column of a pattern 2, a column of a pattern 3, and the like. Furthermore, each of the columns of the pattern 1 to x includes a column of the key allocation, a column of the individual processing amount, a column of the communication load, a column of the processing amount, and a column of the operation ratio. Incidentally, the processing capability of the pertinent tying server (i.e. tying processor), which is stored in the server DB 101, is set into the column of the processing capability. The combination of the tying keys in this pattern is set to the column of the key allocation. The individual processing amount calculated at the step S21 is set to the column of the individual processing amount. Incidentally, data is set in the processing at the step S27, which will be explained later, into the respective columns of the communication load, the processing amount and the operation ratio.

Then, the pattern identifying unit 1053 identifies one unprocessed allocation pattern in the allocation pattern table (step S25). Then, the pattern identifying unit 1053 calculates the communication load, the processing amount and the operation ratio for the respective tying servers in the identified allocation pattern, and sets them into the allocation pattern table (step S27). This processing will be explained by using FIG. 20.

Figure 20A:
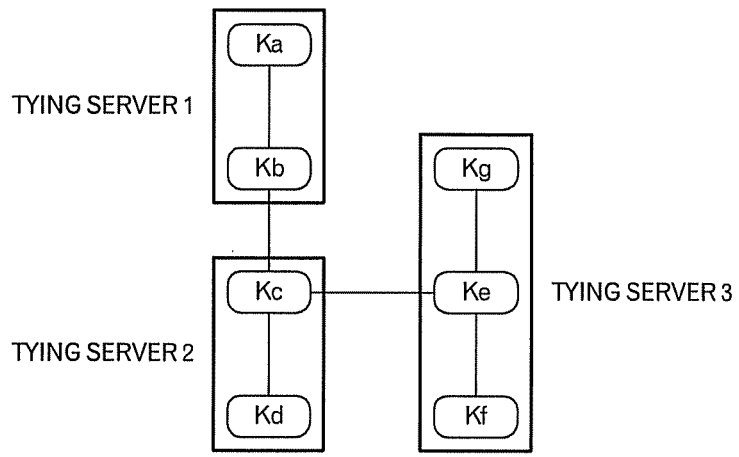
FIGS. 20A to 20C are diagram depicting an example of tying key allocation.

For example, in a case of the pattern 1 in the allocation pattern table depicted in FIG. 19, the allocation as depicted in FIG. 20A is obtained. In FIG. 20A, one link (i.e. a link connecting the nodes Kb and Kc) extending over the tying servers 1 and 2 exists. Here, the pattern identifying unit 1053 calculates the communication load (1=1*1) between the tying servers 1 and 2 by multiplying the number of links extending over the tying servers 1 and 2 by a predetermined weight value (here, "1") and equally allocates the calculated communication load to the tying servers 1 and 2. Namely, "0.5" is allocated to each of the tying servers 1 and 2. In addition, in FIG. 20A, one link (a link connecting the nodes Kc and Ke) extending over the tying servers 2 and 3 exists. Similarly, the pattern identifying unit 1053 calculates the communication load (1=1*1) between the tying servers 2 and 3 by multiplying the number of links extending over the tying servers 2 and 3 by the predetermined weight value (here, "1"), and allocates the calculated communication load to each of the tying servers 2 and 3. Namely, "0.5" is allocated to each of the tying servers 2 and 3. As a result, in a case of the pattern 1, the communication load of the tying server 1 is "0.5", the communication load of the tying server 2 is "1(=0.5+0.5)", and the communication load of the tying server 3 is "0.5". Incidentally, for example, when the communication speed between the tying servers is slow, the weight value to heighten the communication load may be adopted. Then, the pattern identifying unit 1053 calculates, for each tying server, the processing amount by adding the individual processing amount and the communication load. Namely, the processing amount of the tying server 1 is "2.5(=2+0.5)", the processing amount of the tying server 2 is "3(=2+1)", and the processing amount of the tying server 3 is "3.5(=3+0.5). Furthermore, the pattern identifying unit 1053 calculates, for each tying server, a ratio (=processing amount/processing capability) of the processing amount for the processing capability, as the operation ratio. Namely, the operation ratio of the tying server 1 is "125% (=2.5/2)", the operation ratio of the tying server 2 is "150% (=3/2)", and the operation ratio of the tying server 3 is "117% (almost equals to 3.5/3)".

Figure 20B:
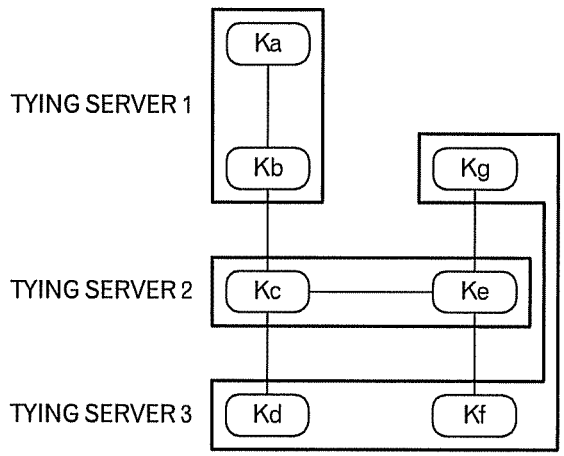

In addition, in a case of the pattern 2 in the allocation pattern table depicted in FIG. 19, the allocation as depicted in FIG. 20B is obtained. In FIG. 20B, one link (i.e. a link connecting the nodes Kb and Kc) extending over the tying servers 1 and 2 exists. The pattern identifying unit 1053 calculates the communication load (1=1*1) between the tying servers 1 and 2 by multiplying the number of links extending over the tying servers 1 and 2 by the predetermined weight value (here, "1"), and equally allocates the calculated communication load to each of the tying servers 1 and 2. Namely, "0.5" is allocated to each of the tying servers 1 and 2. In addition, in FIG. 20B, three links (i.e. a link connecting the nodes Kc and Kd, a link connecting the nodes Ke and Kf and a link connecting the nodes Ke and Kg) extending over the tying servers 2 and 3 exist. The pattern identifying unit 1053 calculates the communication load (3=3*1) between the tying servers 2 and 3 by multiplying the number of links extending over the tying servers 2 and 3 by the predetermined weight value (here, "1"), and equally allocates the calculated communication load to each of the tying servers 2 and 3. Namely, "1.5" is allocated to each of the tying servers 2 and 3. As a result, in a case of the pattern 2, the communication load of the tying server 1 is "0.5", the communication load of the tying server 2 is "2(=0.5+1.5)", and the communication load of the tying server 3 is "1.5". Then, the pattern identifying unit 1053 calculates, for each tying server, the processing amount by adding the individual processing amount and the communication load. Namely, the processing amount of the tying server 1 is "2.5(=2+0.5)", the processing amount of the tying server 2 is "4(=2+2)", and the processing amount of the tying server 3 is "4.5(=3+1.5)". Furthermore, the pattern identifying unit 1053 calculates the ratio (=processing amount /processing capability) of the processing amount for the processing capability as the operation ratio. Namely, the operation ratio of the tying server 1 is "125% (=2.5/2)", the operation ratio of the tying server 1 is "200% (=4/2)" and the operation ratio of the tying server 3 is "150% (=4.5/3)".

Figure 20C:
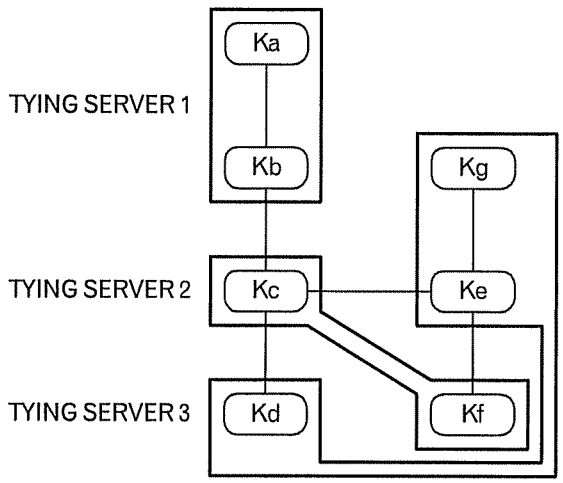

Furthermore, in a case of the pattern 3 in the allocation pattern table depicted in FIG. 19, the allocation as depicted in FIG. 20C is obtained. In FIG. 20C, one link (i.e. a link connecting the nodes Kb and Kc) extending over the tying servers 1 and 2 exists. The pattern identifying unit 1053 calculates the communication load (1=1*1) between the tying servers 1 and 2 by multiplying the number of links extending over the tying servers 1 and 2 by the predetermined weight value (here, "1"), and equally allocates the calculated communication load to the tying servers 1 and 2. Namely, "0.5" is equally allocated to the tying servers 1 and 2. In addition, in FIG. 20C, three links (i.e. a line connecting the nodes Kc and Kd, a link connecting the nodes Kc and Ke and a link connecting the nodes Kf and Ke) extending over the tying servers 2 and 3 exist. The pattern identifying unit 1053 calculates the communication load (3=3*1) between the tying servers 2 and 3 by multiplying the number of links extending over the tying servers 2 and 3 by the predetermined weight value (here, "1"), and equally allocates the communication load to the tying servers 2 and 3. Namely, "1.5" is allocated to each of the tying servers 2 and 3. As a result, in a case of the pattern 3, the communication load of the tying server 1 is "0.5", the communication load of the tying server 2 is "2(=0.5+1.5)", and the communication load of the tying server 3 is "1.5". Then, the pattern identifying unit calculates, for each tying server, by adding the individual processing amount and the communication load. Namely, the processing amount of the tying server 1 is "2.5(=2+0.5)", the processing amount of the tying server 2 is "4(=2+2)", and the processing amount of the tying server 3 is "4.5(=3+1.5)". Furthermore, the pattern identifying unit 1053 calculates, for each tying server, the ratio (=processing amount/processing capability) of the processing amount for the processing capability as the operation ratio. Namely, the operation ratio of the tying server 1 is "125% (=2.5/2)", the operation ratio is "200% (=4/2)", and the operation ratio of the tying server 3 is "150% (=4.5/3)".

Then, the pattern identifying unit 1053 calculates the total value of the communication load in the identified allocation pattern, and stores the calculated value into the allocation pattern table (step S28).

Then, the pattern identifying unit 1053 judges whether or not the processing has been completed for all of the allocation patterns (step S29). When the processing has not been completed for all of the allocation patterns (step S29: No route), the processing returns to the step S25. On the other hand, when the processing has been completed for all of the allocation patterns (step S29: Yes route), the processing shifts to a processing of step S31. Incidentally, when the processing has been completed for all of the allocation patterns, data as depicted in FIG. 21 is stored in the allocation pattern table.

Shifting to the processing of the step S31, the pattern identifying unit 1053 identifies the allocation pattern whose operation ratio satisfies a predetermined condition and whose total value of the communication load is minimized (step S31). Here, for example, the predetermined condition is a condition that all of the operation ratios of the tying servers in the allocation pattern are equal to or less than a predetermined reference value. Incidentally, when there is no allocation pattern satisfying the predetermined condition, the allocation pattern whose difference between the operation ratio and the reference value is the minimum is selected.

Then, the pattern identifying unit 1053 judges whether or not the key allocation and the minimum communication load have been stored into the key allocation storage 107 (step S33). When it is judged that the key allocation and the minimum communication load have not been stored in the key allocation storage 107 (step S33: No route), namely, in a case of the initial processing, the pattern identifying unit 1053 stores the key allocation relating to the identified allocation pattern into the key allocation storage 107, and stores the total value of the communication loads relating to the identified allocation pattern into the key allocation storage 107 as the minimum communication load (step S35). Incidentally, data of the present structure is also stored into the key allocation storage 107. After that, the processing returns to the processing of FIG. 14 through a terminal B, and the processing amount calculation processing is completed. Then, the processing returns to the calling source processing.

On the other hand, when it is judged that the key allocation and the minimum communication load have already been stored into the key allocation storage 107 (step S33: Yes route), namely, in a case of the second processing or the subsequent processing (when this processing is recursively executed, this case occurs), the pattern identifying unit 1053 compares the total value of the communication loads relating to the identified allocation pattern with the minimum communication load stored in the key allocation storage 107, and judges whether or not the total values of the communication loads relating to the identified allocation pattern is less than the minimum communication load stored in the key allocation storage 107 (step S37). When it is judged that the total value of the communication loads relating to the identified allocation pattern is equal to or greater than the minimum communication load (step S37: No route), the processing returns to the processing of FIG. 14 through the terminal B, and the processing amount calculation processing is completed. Then, the processing returns to the calling source processing.

On the other hand, when it is judged that the total value of the communication loads relating to the identified allocation pattern is less than the minimum communication load stored in the key allocation storage 107 (step S37: Yes route), the pattern identifying unit 1053 updates the key allocation and the minimum communication loads, which are stored in the key allocation storage 107, by the key allocation relating to the identified allocation pattern and the total values of the communication loads (step S39). Incidentally, the data of the structure, which is stored in the key allocation storage 107, is further updated by the data of the present structure. After that, the processing returns to the processing of FIG. 14 through the terminal B, and the processing amount calculation processing is completed. Then, the processing returns to the calling source processing.

By carrying out the aforementioned processing, the allocation pattern satisfying the predetermined condition and minimizing the communication load can be identified. Incidentally, when the loop is formed in the structure, the processing amount calculation processing is carried out recursively, while assuming that the link forming the loop is disconnected. Therefore, even when the loop is formed in the structure, the optimal allocation pattern can be identified. In addition, at the step S3, the nodes of the tying keys merely belonging to the single protocol (in the aforementioned example, the nodes Kx, Ky and Kz) are deleted and those tying keys are not included in the allocation pattern. However, because these tying keys are not used in the message tying processing, there is no problem.

Returning to the explanation of FIG. 11, after the processing amount calculation processing (step S5) is carried out, the key priority determination unit 109 determines the priorities of the tying keys based on data stored in the key allocation storage 107, and stores the priorities into the key priority storage 111 (step S7). In this processing, an example that the pattern 1 in the allocation pattern table depicted in FIG. 21 is identified as the allocation pattern whose communication load is the minimum will be explained. First, the key priority determination unit 109 identifies, as a start node, a node, which is considered as being a leaf node in the structure. For example, in case of the pattern 1, the allocation as depicted in FIG. 20A is adopted. In FIG. 20A, the nodes Ka, Kd, Kf and Kg are considered as being the leaf nodes. Here, it is presupposed that the node Ka is selected as the start node. Then, the key priority determination unit 109 detects the respective nodes by tracing the links from the start node. For example, in FIG. 20A, the nodes are detected in an order of the nodes Ka, Kb, Kc and Kd. In addition, after returning to the node Kc, the nodes are detected in an order of the nodes Kc, Ke and Kf. Furthermore, after returning to the node Ke, the nodes are detected in an order of the nodes Ke and Kg. Then, the sequential number is assigned to the node in an order of the detection of the node as the priority of the tying key corresponding to the node. Therefore, the priority (1) of the tying key Ka is the highest, and the priorities (2 to 7) are assigned in an order of the tying keys Kb, Kc, Kd, Ke, Kf and Kg. Incidentally, there are branches from the node Kc to the nodes Kd and Ke. However, because there is no protocol including the both of the tying keys Kd and Ke, the same priority may be assigned to the tying keys Kd and Ke. As for the tying keys Kf and Kg, the same discussion may be applied. After that, this processing is completed.

By carrying out the aforementioned processing, the allocation pattern satisfying the predetermined condition and minimizing the communication load can be identified and the priorities of the tying keys can be determined appropriately. Therefore, while suppressing the communication loads between the tying processors 117 to 121, the tying processing can be parallelized. Incidentally, the tying processors 117 to 121 carry out the tying processing according to the key allocation stored in the key allocation storage 107. In addition, the message distributor 115 allocates the messages according to the key allocation stored in the key allocation storage 107 and the priorities stored in the key priority storage 111.

Although one embodiment was explained in the above, this technique is not limited to this embodiment. For example, it is presupposed that the configuration depicted in FIG. 6 is realized by the plural computers. However, it is arbitrary what element is implemented in what computer. For example, the plural tying processors may be activated on one computer. Incidentally, in FIG. 6, an example that the number of tying processors is "3" is depicted. However, the number of tying processors is not limited to "3".

In addition, although an example that two tying keys are included in one message was explained, there is a case where three or more tying keys are included in one message. For example, an example that three tying keys are included in the message is depicted in FIG. 22A. In such a case, a processing may be carried out according to the structure as depicted in FIG. 22B. Incidentally, the link P1 in the structure of FIG. 22B is not a normal link connecting two nodes, but represents a conceptional link connecting three nodes. Namely, in FIG. 22B, the nodes Ka and Kb, the nodes Kb and Kc and the nodes Ka and Kc are connected with the link P1. However, no loop is formed by the nodes Ka, Kb and Kc. Thus, in a case where the message includes three or more tying keys, the structure is represented by the conceptual link. By using such a conceptual link, it becomes possible to cope with the case where the message includes three or more tying keys.

In addition, the aforementioned table configurations are mere examples, and the aforementioned configurations can be changed. Furthermore, as for the processing flow, as long as the processing results are not changed, the order of the steps may be exchanged, and the plural steps may be executed in parallel.

The embodiment may be outlined as follows:

This message tying processing method include: extracting tying keys from a key definition database storing, for each protocol, tying keys included in messages relating to the protocol and used in a message tying processing, and generating data of a structure including nodes respectively corresponding to the extracted tying keys and links connecting between the nodes of the tying keys belonging to the same protocol: judging whether or not a loop is formed in the structure by the plural links; when it is judged that the loop is not formed in the structure, identifying, among allocation patterns that are combinations of allocation of the tying keys to each of plural tying processing units, that respectively carry out the tying processing in cooperation with each other, an allocation pattern satisfying a predetermined condition including a first condition that a communication load between the tying processing units is the minimum, and storing allocation data relating to the identified allocation pattern into a key information storage device.

Thus, because the allocation pattern minimizing the communication load between the tying processing units is identified, the message tying processing can be parallelized while suppressing the communication loads of the tying processing units.

In addition, the message tying processing method may further include: when it is judged that the loop is not formed in the structure, identifying, as a start node, one of the nodes considered as a leaf node in the structure; and detecting the nodes by tracing the links from the start node in the structure, assigning sequential numbers to the detected nodes in an order of the detection as priorities of the tying keys corresponding to the detected nodes, and storing the priorities into a priority storage device. Thus, the priority is assigned to each tying key along the links (i.e. connections of the tying keys). Therefore, for example, in a case where the message including the plural tying keys is received, the message tying can be parallelized appropriately by allocating the messages to the tying processing unit in charge according to the tying key having higher priority.

Furthermore, the message tying processing method may further include: when it is judged that the loop is formed in the structure, carrying out the judging and subsequent processing, for each of links that form the loop, while assuming the pertinent link is disconnected. Then, the aforementioned identifying the allocation pattern may include: when the allocation data and the communication load are not stored in the key information storage device, storing the allocation data and the communication load, which relate to the identified allocation pattern, into the key information storage device; when the allocation data and the communication load have already been stored, comparing the communication load relating to the identified allocation pattern with the communication load stored in the key information storage device, and when the communication load relating to the identified allocation pattern is less than the communication load stored in the key information storage device, updating the key information storage device by the allocation data and the communication load, which relate to the identified allocation pattern. By carrying out such a processing, it becomes possible to cope with a case where the loop is formed in the structure.

In addition, the identifying the allocation pattern may include counting, for each allocation pattern and for each tying processing unit, the number of links connecting the node of the tying key in the pertinent tying processing unit and the node of the tying key in the other tying processing unit, and calculating the communication load by multiplying the number of links by a predetermined weight value.

Furthermore, the aforementioned predetermined condition may include a second condition concerning an operation ratio of the tying processing unit.

In addition, the identifying allocation pattern may include calculating, for each allocation pattern and for each tying processing unit, a processing amount of the pertinent tying processing unit by adding the communication load and the number of tying keys in the tying processing unit, and calculating a ratio of the processing amount for the processing capability of the pertinent tying processing unit as the operation ratio.

Furthermore, the second condition may be a condition that all of the operation ratios of the tying processing units in the allocation pattern is less than a reference value or within a predetermined range. Thus, the allocation pattern is not adopted in which the processing is concentrated into a certain tying processing unit even if the communication load is low. Therefore, it becomes possible to carry out an appropriate parallel processing.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

Figure 6:
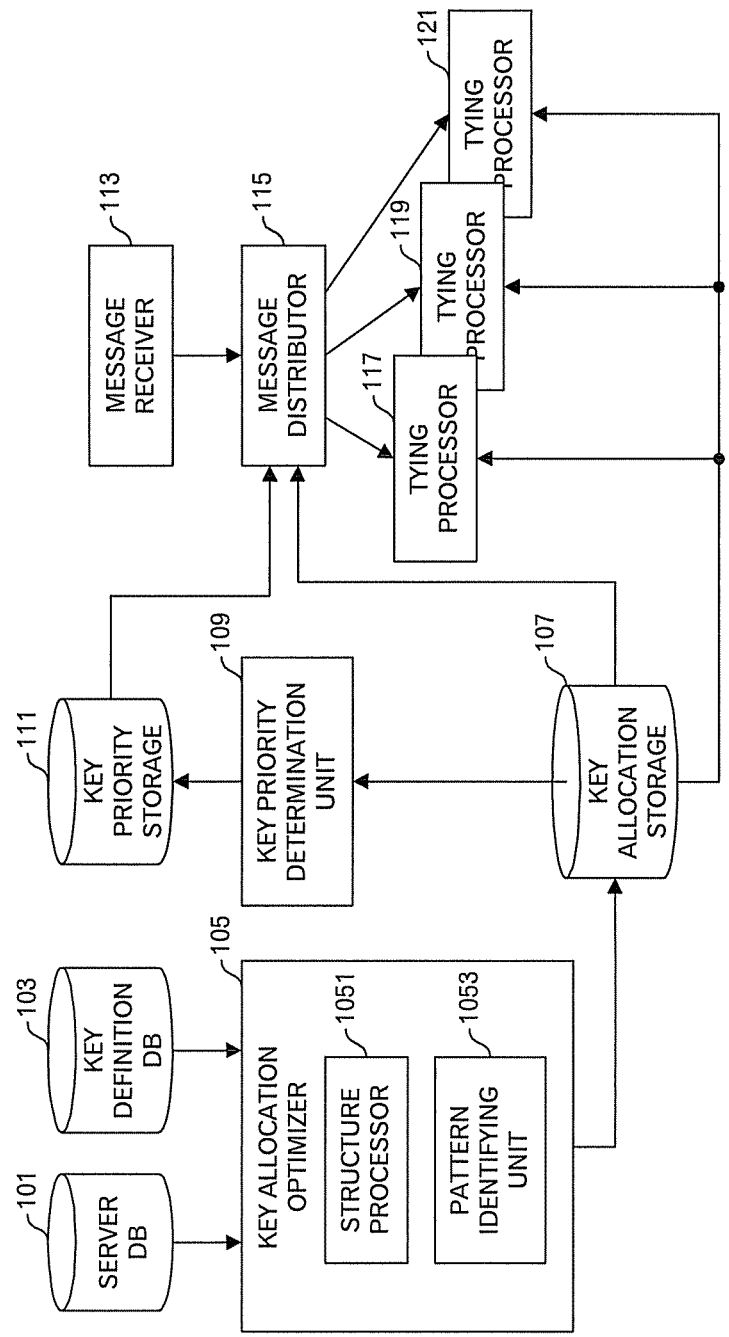
FIG. 6 is a functional block diagram of a message tying processing apparatus relating to this embodiment.

In addition, the computer in the configuration depicted in FIG. 6 is a computer device as shown in FIG. 23. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 23. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process, comprising:
extracting tying keys from a key definition database storing, for each protocol, tying keys that are included in messages relating to the protocol, wherein the messages are exchanged among computers included in a first system, and are received and processed in a second system including a plurality of tying processing units and a message distribution unit, and that the plurality of tying processing units are connected through a network with the message distribution unit and respectively carry out a message tying processing for tying messages included in one transaction, and the message distribution unit distributes the messages to the plurality of tying processing units based on an allocation pattern of the tying keys;
generating a data structure including nodes respectively corresponding to the extracted tying keys and links connecting said nodes of said tying keys belonging to the same protocol;
judging whether or not a loop is formed in said data structure by a plurality of links;
upon judging that said loop is not formed in said data structure, identifying, among a plurality of allocation patterns, each of which represents one or plural tying keys of which each of the plurality of tying processing units is in charge, an allocation pattern that satisfies a predetermined condition including a first condition that a communication load between said tying processing units is minimum and is to be used by the message distribution unit, wherein the communication load is calculated for each of the plurality of allocation patterns, by counting the number of links in the structure, between one node of one tying key of which one tying processing unit of the plurality of tying processing units is in charge in the allocation pattern, and another node of another tying key of which another tying processing unit of the plurality of tying processing units is in charge in the allocation pattern, and the predetermined condition comprises a second condition concerning an operation ratio of the tying processing unit.

2. The computer-readable, non-transitory storage medium as set forth in claim 1, said process further comprising:
upon judging that said loop is not formed in said data structure, identifying a start node connected to only one link from among, said nodes in said structure; and
detecting nodes in the structure by tracing said links from said start node in said data structure to an end node connected to only one link, assigning sequential numbers to the detected nodes in an order of the detection as priorities of said tying keys corresponding to the detected nodes.

3. The computer-readable, non-transitory storage medium as set forth in claim 1, said process further comprising:
upon judging that said loop is formed in said data structure, carrying out said judging and subsequent processing, for each of said links that form said loop, while assuming the link is disconnected, and
wherein said identifying comprises:
upon detecting that the allocation pattern was firstly identified, storing allocation data relating to the identified allocation pattern and said communication load of the identified allocation pattern, into a key information storage device; and upon detecting that allocation data and a communication load have already been stored in said key information storage device, comparing said communication load relating to the identified allocation pattern with said communication load stored in said key information storage device, and upon detecting that said communication load relating to the identified allocation pattern is less than said communication load stored in said key information storage device, updating said key information storage device by the allocation data and said communication load, which relate to the identified allocation pattern.

4. The computer-readable, non-transitory storage medium as set forth in claim 1, wherein said identifying comprises counting, for each said allocation pattern and for each said tying processing unit, the number of links in the data structure, between one node of one tying key of which one tying processing unit of the plurality of tying processing units is in charge in the allocation pattern, and another node of another tying key of which another tying processing unit of the plurality of tying processing units is in charge in the allocation pattern, and calculating, for each said allocation pattern, said communication load by multiplying said number of links for the allocation pattern by a predetermined weight value.

5. The computer-readable, non-transitory storage medium as set forth in claim 1, wherein said identifying comprises calculating, for each said allocation pattern and for each said tying processing unit, a first value of the tying processing unit by adding said communication load and the number of tying keys allocated to the tying processing unit, and calculating a ratio of the first value to a processing capability of the pertinent tying processing unit as an operation ratio.

6. The computer-readable, non-transitory storage medium as set forth in claim 1, wherein said second condition is a condition that all of said operation ratios of said tying processing units in said allocation pattern is less than a reference value or within a predetermined range.

7. A message tying processing method, comprising:
extracting tying keys from a key definition database storing, for each protocol, tying keys that are included in messages relating to the protocol wherein the messages are exchanged among computers included in a first system, and are received and processed in a second system including a plurality of tying processing units and a message distribution unit, and that the plurality of tying processing units are connected through a network with the message distribution unit, and respectively carry out a message tying processing for tying messages included in one transaction and the message distribution unit distributes the messages to the plurality of tying processing units based on an allocation pattern of the tying keys;
generating a data structure including nodes respectively corresponding to the extracted tying keys and links connecting said nodes of said tying keys belonging to the same protocol;
judging whether or not a loop is formed in said data structure by a plurality of links;
upon judging that said loop is not formed in said data structure, identifying, among a plurality of allocation patterns, each of which represents one or plural tying keys of which each of the plurality of tying processing units is in charge, an allocation pattern that satisfies a predetermined condition including a first condition that a communication load between said tying processing units is minimum, and is to be used by the message distribution unit, wherein the communication load is calculated for each of the plurality of allocation patterns, by counting the number of links in the structure, between one node of one tying key of which one tying processing unit of the plurality of tying processing units is in charge in the allocation pattern, and another node of another tying key of which another tying processing unit of the plurality of tying processing units is in charge in the allocation pattern, and the predetermined condition comprises a second condition concerning an operation ratio of the tying processing unit.

8. message tying processing apparatus, comprising:
a key definition database storing, for each protocol, tying keys that are included in messages relating to the protocol and are used in a message tying processing for tying messages included in one transaction;
a key allocation optimizer unit, the key allocation optimizer unit comprising a structure processor unit and a pattern identifying unit;
the structure processor unit extracts tying keys from said key definition database, wherein the messages are exchanged among computers included in a first system, and are received and processed in a second system including a plurality of tying processing units and a message distribution unit, and the plurality of tying processing units are connected through a network with the message distribution unit and respectively carry out a message tying processing for tying messages included in one transaction, and the message distribution unit distributes the messages to the plurality of tying processing units based on an allocation pattern of the tying keys, to generate a data structure including nodes respectively corresponding to the extracted tying keys and links connecting said nodes of said tying keys belonging to the same protocol;
the structure processor unit judges whether or not a loop is formed in said data structure by a plurality of links;
the pattern identifying unit upon being judged that said loop is not formed in said data structure, identifies among a plurality of allocation patterns each of which represents one or plural tying keys of which each of the plurality of tying processing units is in charge, an allocation pattern that satisfies a predetermined condition including a first condition that a communication load between said tying processing units is minimum and is to be used by the message distribution unit, wherein the communication load is calculated for each of the plurality of allocation patterns, by counting the number of links in the structure, between one node of one tying key of which one tying processing unit of the plurality of tying processing units is in charge in the allocation pattern, and another node of another tying key of which another tying processing unit of the plurality of tying processing units is in charge in the allocation pattern, and the predetermined condition comprises a second condition concerning an operation ratio of the tying processing unit.

* * * * *

UNITED STATES PATENT AND TRADEMARK OFFICE
CERTIFICATE OF CORRECTION

PATENT NO. : 8,539,035 B2
APPLICATION NO. : 12/559918
DATED : September 17, 2013
INVENTOR(S) : Yuuji Hotta et al.

Page 1 of 1

It is certified that error appears in the above-identified patent and that said Letters Patent is hereby corrected as shown below:

On the Title Page, In Col. 2 (Other Publications), Line 1, delete "Garcai" and insert -- Garcia --, therefor.
On Title Page 2, Col. 2 (Other Publications), Line 10, delete "Garcai" and insert -- Garcia --, therefor.

In the Claims:
In Col. 14, Line 16 (Approx.), In Claim 1, after "and" delete "that".
In Col. 15, Line 48 (Approx.), In Claim 7, after "and" delete "that".
In Col. 16, Line 17, In Claim 8, before "message" insert -- A --.
In Col. 16, Line 22, In Claim 8, delete "unit," and insert -- unit --, therefor.
In Col. 16, Line 36 (Approx.), In Claim 8, delete "keys," and insert -- keys and --, therefor.
In Col. 16, Line 40 (Approx.), In Claim 8, delete "protocol;" and insert -- protocol --, therefor.

Signed and Sealed this
Seventh Day of January, 2014

Margaret A. Focarino
*Commissioner for Patents of the United States Patent and Trademark Office*